United States Patent [19]

Evans

[11] Patent Number: 5,261,514

[45] Date of Patent: Nov. 16, 1993

[54] GROUNDING CABLE REEL FOR VEHICLE

[75] Inventor: Maurice Evans, Kalamazoo, Mich.

[73] Assignee: Woodhead Industries, Inc., Northbrook, Ill.

[21] Appl. No.: 878,407

[22] Filed: May 4, 1992

[51] Int. Cl.$^5$ .......................... H02G 11/02
[52] U.S. Cl. .............. 191/12.2 R; 174/55 G; 242/86.5 R; 439/18
[58] Field of Search .......... 191/12 R, 12.2 R, 12.2 A; 174/5 R, 55 G; 439/18, 20–23, 27–28; 242/86.5 R, 86.51

[56] References Cited

U.S. PATENT DOCUMENTS

| 899,613 | 9/1908 | Pifer | 191/12.2 R |
|---|---|---|---|
| 1,689,098 | 10/1928 | Wyman | 191/12.2 R |
| 2,016,441 | 10/1935 | Kelly | 191/12.2 R |
| 2,391,141 | 12/1945 | Dour et al. | 191/12.2 R |
| 3,176,931 | 4/1965 | Hannay | 191/12.2 R X |
| 3,700,834 | 10/1972 | Schaefer | 191/12.2 R |
| 3,861,505 | 1/1975 | Sugimura | 191/12.2 R |
| 4,021,090 | 5/1977 | Fredericksen | 439/4 |
| 4,102,445 | 7/1978 | Eurom | 191/12.2 R |
| 4,123,753 | 10/1978 | Gravert | 340/621 |
| 4,154,324 | 5/1979 | Upton et al. | 191/12.2 R |
| 4,318,461 | 3/1982 | Brorein | 191/12.2 R |
| 4,476,576 | 10/1984 | Wheeler et al. | 455/97 |
| 4,577,809 | 3/1986 | Auer | 191/12.2 R X |
| 4,584,442 | 4/1986 | Shields et al. | 191/12.2 R |
| 4,691,084 | 9/1987 | Standing | 191/12.2 R |

Primary Examiner—Frank E. Werner
Assistant Examiner—Scott L. Lowe
Attorney, Agent, or Firm—Emrich & Dithmar

[57] ABSTRACT

A grounding cable reel for grounding a vehicle of the type used to service electrical power lines includes a reel assembly incorporating a conductive slip ring capable of conducting very large, short term ground fault loads, i.e., on the order of 20,000 amps. A first cable connected at one end to the vehicle's frame is coupled at its second end to a copper rod which extends through a hollow shaft which supports the reel such as for mounting to the vehicle. The copper rod is coupled to a conductive inner hub of the slip ring which is mounted to an end of the hollow support shaft. Rotationally coupled to the inner hub is an outer conductive swivel to which a first end of a second cable is coupled, while the second end of the second cable may be coupled to a grounding post or other grounded object. The second cable is disposed about the reel which is coupled to the outer swivel and rotates therewith. A louvered circular conductive strip is disposed intermediate and in contact with the inner hub and the outer swivel for providing electrical continuity in the slip ring. The inner hub and outer swivel are preferably comprised of brass for conducting large currents and for serving as a heat sink, while the contact strip allows for rotation of the outer swivel on the inner hub and electrical current conduction therebetween and is preferably comprised of a silver alloy.

25 Claims, 2 Drawing Sheets

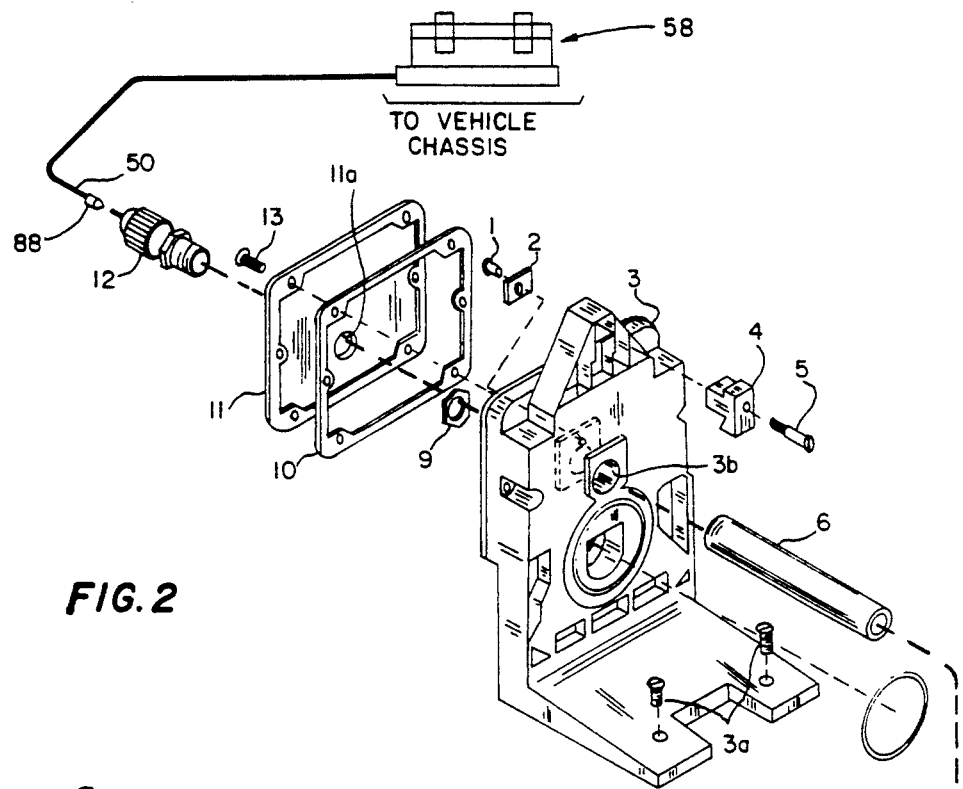
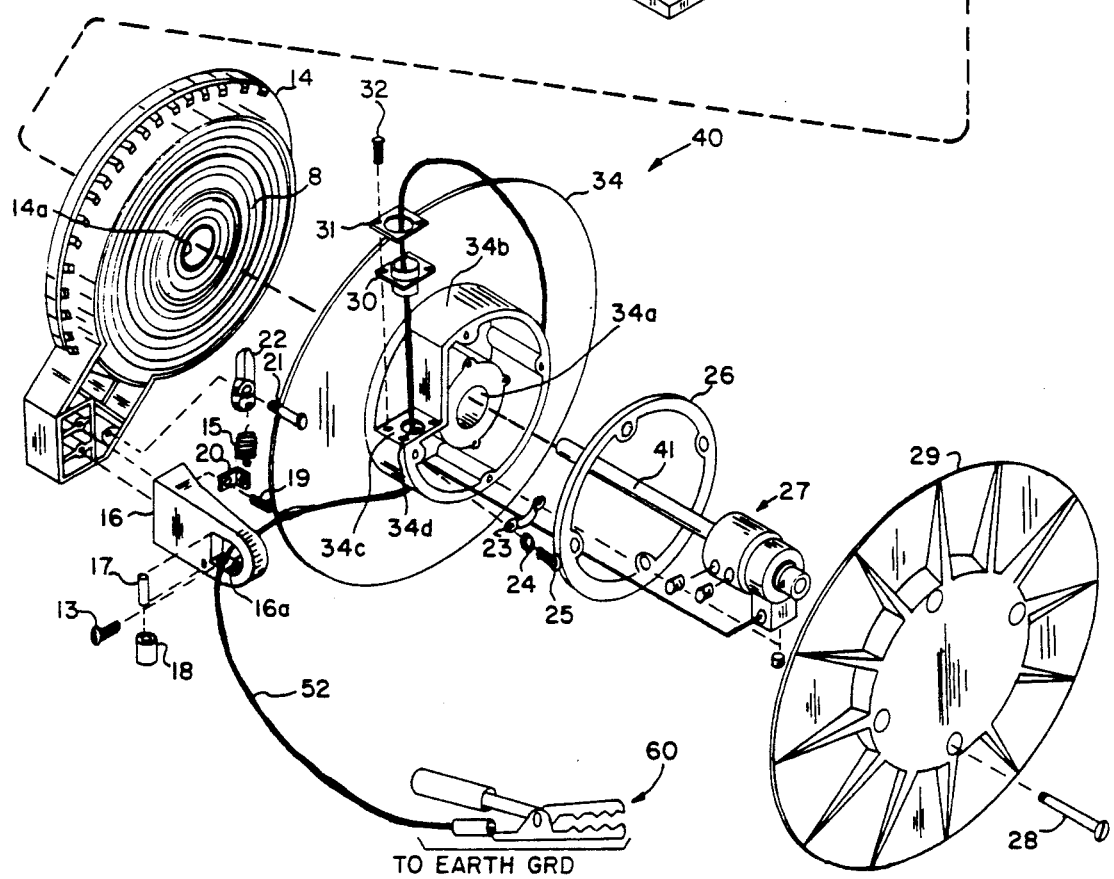
FIG. 2

GROUNDING CABLE REEL FOR VEHICLE

FIELD OF THE INVENTION

This invention relates generally to an arrangement for connecting a vehicle to neutral ground and is particularly directed to a grounding cable reel for grounding a vehicle such as an electrical utility maintenance vehicle.

BACKGROUND OF THE INVENTION

Vehicles used by a lineman in the maintenance and repair of electrical power lines must be grounded for safety reasons. The lineman typically connects one end of a cable to the frame of the vehicle and another end of the cable to either a grounding stake adjacent the utility pole or to a metal support structure for the overhead power lines. The cable generally lies loose in the vehicle when not in use and is subject to abuse and damage. The cable also must frequently be untangled before being extended for use. This is not only time consuming and cumbersome for the linemen, but also may be hazardous if the cable is damaged so as to prevent a large electrical current to pass safely to ground and such damage goes undetected.

The present invention addresses the aforementioned limitations of the prior art by providing a safe, reliable and convenient arrangement for grounding a vehicle, such as an electrical utility vehicle. The arrangement includes a grounding cable reel incorporating a slip ring having a large mass and high conductivity so as to serve as a heat sink and to conduct very large currents to ground in a safe manner.

OBJECTS AND SUMMARY OF THE INVENTION

Accordingly, it is an object of the present invention to provide a safe, reliable and convenient means for coupling a vehicle to neutral ground.

It is another object of the present invention to provide a grounding cable reel for grounding a vehicle which is capable of safely conducting very large currents to ground.

Yet another object of the present invention is to provide a highly conductive, rugged slip ring assembly in a cable reel assembly for conducting very large currents safely to ground.

A further object of the present invention is to provide a conductive slip ring assembly such as for use in a cable reel which affords a current conducting path between the two rotationally coupled members of the slip ring for carrying very large currents such as encountered in electric power lines.

A still further object of the present invention is to provide a rotating conductive coupling between a first fixed cable and a second reel-mounted cable which is capable of accommodating very large currents in the two coupled cables.

These objects of the present invention are achieved and the disadvantages of the prior art are eliminated by an arrangement for grounding a vehicle comprising: a hollow shaft; a conductive rod disposed in said shaft; a first cable coupled to the vehicle and to said conductive rod; a conductive slip ring assembly including an inner hub fixedly mounted to an end of the shaft and connected to said conductive rod, an outer swivel rotationally mounted on the inner hub, and a conductive ring or strip disposed intermediate the inner hub and the outer swivel for establishing substantially continuous and complete electrical contact between the inner hub and the outer swivel; a drum fixedly mounted to the outer swivel; and a second cable connected to the outer swivel and disposed about the drum and adapted for unwinding from the drum when the outer swivel is rotationally displaced relative to the inner hub and for coupling to neutral ground.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2 is an exploded perspective view of a grounding cable reel for a vehicle in accordance with the principles of the present invention;

FIG. 2a is an exploded perspective view of a conductive slip ring assembly used in the inventive grounding cable reel of FIG. 2;

FIG. 3 is a sectional view of a conductive slip ring assembly used in the grounding cable reel for a vehicle of the present invention;

FIG. 4a is an enlargement of a portion of the sectional view of FIG. 3 illustrating details of the coupling between an inner hub and an outer swivel of the slip ring assembly;

FIG. 4b is an elevational view shown partially in section and partially in phantom of the conductive slip ring assembly of FIG. 3 illustrating additional details of the coupling between the inner hub and the outer swivel of the slip ring;

FIG. 5 is a plan view of a contact strip or ring disposed intermediate the inner hub and the outer swivel of the slip ring assembly; and FIG. 6 is a sectional view of a portion of the contact strip shown in FIG. 5 taken along site line 6—6 therein.

DETAILED DESCRIPTION

Figure 1:
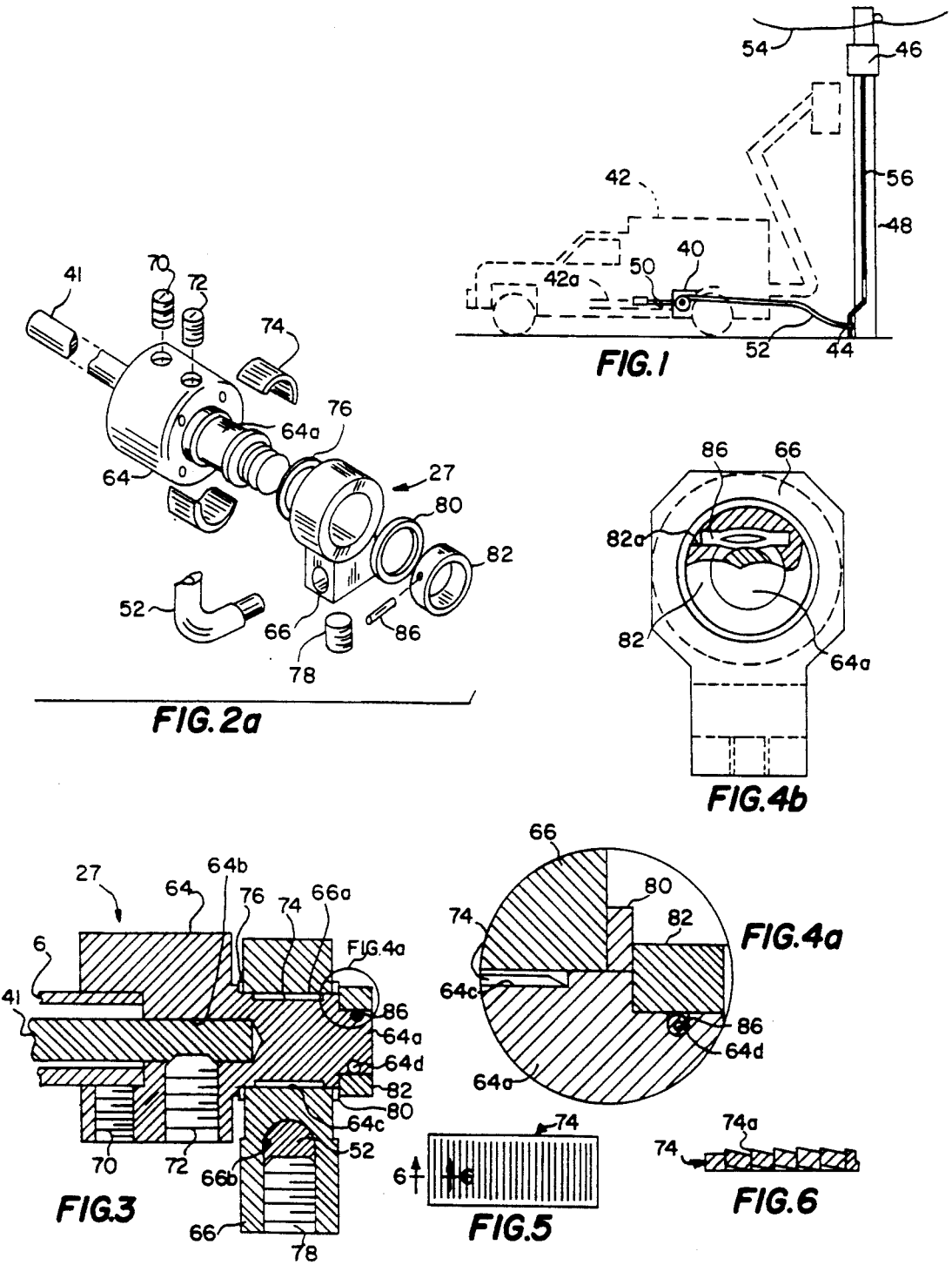
FIG. 1 is a simplified schematic diagram showing a grounding cable reel in accordance with the present invention coupling a vehicle to neutral ground.

Referring to FIG. 1, there is shown in simplified schematic diagram form a grounding cable reel 40 connecting a vehicle 42 to a ground post, or stake, 44 in accordance with the present invention. Grounding cable reel 40 is particularly adapted for use with a vehicle 42 such as employed by an electric power utility in the servicing of electric power lines and equipment. Grounding cable reel 40 includes a first input cable 50 connected to the chassis 42a of vehicle 42. Grounding cable reel 40 further includes a second active cable 52 coupled to neutral ground potential such as by means of the ground post 44 shown in FIG. 1. The second active cable 52 may also be conveniently coupled to a metal support frame such as used for supporting overhead power lines for grounding vehicle 42. A ground post 44 is typically located at the base of a support post 48. Support post 48 may be used to provide support for power lines 54 or overhead equipment such as a transformer 46. Ground post 44 is typically connected to any such overhead equipment such as transformer 46 by a ground cable 56 for safety purposes. Grounding vehicle 42 by means of grounding cable reel 40 and first and second cables 50, 52 eliminates the hazards of induced voltages such as arising from accidental contact with an energized conductor such as power line 54.

Referring to FIG. 2, there is shown an exploded perspective view of the inventive grounding cable reel 40 shown connected to the first input cable 50 and the second active cable 52. Attached to one end of the first input cable 50 is a mounting bracket 58 for securely coupling to the vehicle to be grounded. The other end of the first input cable 50 is coupled via a conventional connector 88 to a conductive copper rod 41 and thence to the grounding cable reel 40 as described below. One end of the second active cable 52 is coupled by means of a clamp 60, such as of the alligator type, to neutral (earth) ground. The other end of the second active cable 52 is coupled to the grounding cable reel 40 as described below.

Grounding cable reel 40 includes a base 3 for attachment to the vehicle by means of mounting screws 3a. Base 3 includes an aperture 3b therein through which a support shaft 6 is inserted. Coupled to a first side of base 3 is the combination of a junction box gasket 10 and a junction box cover 11 which are maintained securely in position on the base by means of a plurality of screws 13. Junction box cover 11 includes an aperture 11a therein in which a water-tight strain relief connector 12 is positioned. Strain relief connector 12 is maintained in position within the junction box cover 11 by means of nut 9. Shaft 6 is maintained in position in a fixed manner within the aperture 3b in base 3 by means of a shaft retainer 2 attached to the base by means of a screw 1. The strain relief connector 12 forms a water-tight seal about the first input cable 50 within aperture 11a in the junction box cover 11.

Disposed on shaft 6 in closely spaced relation to base 3 is a spring pocket assembly 14. Shaft 6 is inserted through a center aperture 14a within the spring pocket assembly 14. Spring pocket assembly 14 is coupled to base 3 by means of a combination of a clamp 4 and hex head bolt 5 for maintaining the spring pocket assembly in fixed relation to the base. Spring pocket assembly 14 includes a clock-type retraction spring 8 maintained under tension for urging the second active cable 52 to a retracted position on an inner drum half 34 as described below. Spring pocket assembly 14 further includes a combination of an extension spring 15, a spring clip 20 and a ratchet pawl 22 for allowing the inner drum half 34 to be rotationally displaced about shaft 6 relative to the fixed spring pocket assembly 14 as the second active cable 52 is withdrawn from the grounding cable reel 40, while preventing counter-rotation of the inner drum half and retraction of the second active cable once withdrawn from the grounding cable reel. This combination operates as a conventional ratchet locking mechanism and is not described further herein. Retraction spring 8 automatically retracts the second active cable 52 onto the inner drum half 34 when tension is applied to the second active cable. The combination of extension spring 15 and ratchet pawl 22 is coupled to the spring pocket assembly 14 by means of mounting screw 21. Spring clip 20 is coupled to the spring pocket assembly 14 by means of mounting screw 19 which is also used to attach a cable guide 16 to the spring pocket assembly.

Cable guide 16 includes the combination of a roller shaft 17 and roller 18 maintained in position by means of a mounting screw 13 Roller 18 is disposed adjacent an aperture 16a within cable guide 16 and is adapted to engage the second active cable 52 when routed through the aperture 16a in cable guide. Cable guide 16 limits lateral displacement of the second active cable 52 during unwinding from and winding onto inner drum half 34.

Inner drum half 34 includes a center aperture 34a through which shaft 6 is inserted. Inner drum half 34 freely rotates on shaft 6, while the spring pocket assembly 14 is fixedly disposed on the support shaft in that it is secured to base 3. Inner drum half 34 further includes an inner generally cylindrical portion 34b extending from one side of the inner drum half 34. Inner cylindrical portion 34b is disposed concentrically about center aperture 34a within the inner drum half 34 and includes a recessed portion 34c having an aperture 34d therein. The inner cylindrical portion 34b of the inner drum half 34 is securely coupled to an outer drum half 29 by means of a plurality of screws 28, with a drum gasket 26 disposed intermediate the inner cylindrical portion and the outer drum half. The second active cable 52 is wound around the inner cylindrical portion 34b intermediate the inner and outer drum halves 34 and 29 and extends into the inner cylindrical portion via an aperture 34d disposed in a recessed portion of the inner cylindrical portion of the inner drum half.

Disposed within the inner cylindrical portion 34b of the inner drum half 34 and attached to one end of the main shaft 6 is a conductive slip ring assembly 27. Slip ring assembly 27 is further coupled by means of conductive rod 41 to one end of the first input cable 50 and to one end of the second active cable 52. The combination of a cable seal 30, a seal cover 31 and a mounting screw 32 fixedly maintains the second active cable 52 within aperture 34d in the inner cylindrical portion 34b to prevent chaffing and to provide a sealed entry for the cable. A cable clamp 23 engages the second active cable 52 within the inner cylindrical portion 34b of the inner drum half 34 and securely maintains it in fixed position therein. Cable clamp 23 is maintained in position within the inner cylindrical portion 34b of the inner drum half 34 by means of the combination of a washer 24 and screw 25.

Referring to FIG. 2a, there is shown an exploded perspective view of the conductive slip ring assembly 27. A sectional view through the center of the slip ring assembly 27 is shown in FIG. 3, while an enlarged portion of the sectional view of FIG. 3 is shown in FIG. 4a. Slip ring assembly 27 is preferably comprised of a highly electrically conductive material such as brass and is sufficiently massive to withstand the energy generated by thousands of volts. Slip ring assembly 27 includes an inner hub 64 rotationally coupled to an outer swivel 66. Inner hub 64 includes an end slot for receiving an end of the support shaft 6. Inner hub 64 is securely attached to the support shaft 6 by means of a set screw 70. Inner hub 64 is thus attached to the support shaft 6 in a fixed manner and does not rotate.

Inner hub 64 further includes a cylindrical slot 64b therein adapted to receive an end of the conductive rod 41. Conductive rod 41 is securely maintained within slot 64b of inner hub 64 by means of silver solder in a preferred embodiment which also ensures a high degree of electrical contact between the conductive rod and the inner hub. A set screw 72 within inner hub 64 further ensures against removal of the conductive rod 41 from the inner hub 64. Inner hub 64 further includes a cylindrical shaft 64a which is inserted through a circular aperture 66a in swivel 66. Swivel 66 is freely rotatable relative to the inner hub 64 as well as relative to the fixed support shaft 6 coupled to the aforementioned hub. Swivel 66 is maintained in position on the shaft 64a of inner hub 64 by means of inner and outer retaining washers 76 and 80 and a retaining collar 82. Retaining collar 82 is disposed about a first recessed groove 64d about shaft 64a and includes a blind hole 82a. A drive pin 86 is inserted in blind hole 82a and within the first recessed groove 64d in shaft 64a for securely coupling the outer swivel 66 to the inner hub 64 as shown in the elevational view shown partially in section and partially in phantom of FIG. 4b. By distorting blind hole 82a such as by means of a staking tool after insertion of drive pin 86, the connection between inner hub 64 and outer swivel 66 may be made tamper-proof for increased safety.

Disposed within and about the cylindrical shaft 64a of inner hub 64 is a second recessed slot 64c. Disposed within recessed slot 64c and intermediate the rotationally coupled inner hub 64 and swivel 66 is a contact strip, or ring, 74 shown in the plan view of FIG. 5 and in the partial sectional view in FIG. 6. Contact strip 74 is preferably comprised of a highly conductive material such as silver alloy and includes a plurality of spaced louvers 74a. Each of the louvers 74a provides an upraised, elongated, linear rib, or ridge, in contact with the inner circumference of aperture 66a within swivel 66 about the circumference of the inner hub shaft 64a. Each of the louvers 74a is formed by cutting a plurality of spaced, linear slots in contact strip 74 aligned generally transverse to the length of the strip and then twisting each of the thus formed louvers 74a to a given angle relative to the plane of the contact strip. The flexible, resilient characteristic of the metallic contact strip 74 allows each of the louvers 74a to rotate somewhat about its lengthwise axis and about its connections at respective ends to the contact strip 74. This flexure of the louvers 74a provides uniform contact between the swivel 66 and the inner hub's shaft 64a about the entire circumference thereof. Prior to insertion between the inner hub's shaft 64a and swivel 66, contact strip 74 is wound in a generally circular shape and inserted in the recessed slot 64c disposed about the inner hub's shaft 64a. It should be noted that while contact strip 74 is shown in broken form FIG. 2a for simplicity, the contact strip is a single piece in a preferred embodiment.

Swivel 66 includes a cylindrical slot 66b within which one end of the second active cable 52 is inserted. The second active cable 52 is securely maintained in position within swivel 66 by means of a set screw 78. With the second active cable 52 thus in electrical contact with swivel 66 and with the first input cable 50 in electrical contact with inner hub 64 via the conductive rod 41, and with inner hub and swivel electrically coupled by means of contact strip 74 in a freely rotatable manner, the first input cable, slip ring assembly 27 and the second active cable form a continuous conductive path to ground capable of conducting very large currents.

There has thus been shown a grounding cable reel for coupling a vehicle to neutral ground. The grounding cable reel includes a first input cable coupled to the chassis of the vehicle, a second active cable coupled to neutral ground, and a cable reel assembly including a conductive slip ring assembly for coupling the two cables in circuit. The conductive slip ring assembly, preferably comprised of brass, includes an inner hub and an outer swivel rotationally coupled and in electrical contact by means of a highly conductive circular contact strip disposed therebetween. The grounding cable reel of the present invention is capable of conducting very large currents, i.e., 20,000 amps and greater, to ground.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A grounding cable reel for a vehicle comprising:
   a hollow shaft;
   a conductive rod disposed in said shaft;
   a first cable coupled to the vehicle and to said conductive rod;
   a conductive slip ring assembly including an inner hub fixedly mounted to an end of said shaft and connected to said conductive rod, an outer swivel rotationally mounted on said inner hub, and conducting means disposed intermediate said inner hub and said outer swivel and in contact with an entire inner circumference of said outer swivel and an entire outer circumference of said inner hub for establishing substantially continuous and complete electrical contact between said inner hub and said outer swivel;
   a drum fixedly mounted to said outer swivel; and
   a second cable connected to said outer swivel and disposed about said drum and adapted for unwinding from said drum when said outer swivel is rotationally displaced relative to said inner hub, wherein said second cable is coupled to neutral ground.

2. The grounding cable reel of claim 1 further comprising mounting means for attaching said shaft to the vehicle.

3. The grounding cable reel of claim 2 further comprising biasing means coupled to said drum for urging said drum in a first direction of rotation about said shaft for winding said second cable onto said drum.

4. The grounding cable reel of claim 3 wherein said biasing means includes a spring under tension.

5. The grounding cable reel of claim 1 further comprising first coupling means for connecting an end of said conductive rod to said inner hub.

6. The grounding cable reel of claim 5 wherein said first coupling means includes silver solder.

7. The grounding cable reel of claim 5 further comprising second coupling means for connecting an end of said second cable to said outer swivel.

8. The grounding cable reel of claim 7 wherein said second coupling means includes a set screw disposed in said outer swivel.

9. The grounding cable reel of claim 1 wherein said inner hub and said outer swivel are comprised of metal.

10. The grounding cable reel of claim 9 wherein said metal is brass.

11. The grounding cable reel of claim 1 wherein said conducting means is disposed about said inner hub so as to engage an inner circular aperture in said outer swivel within which said inner hub is inserted.

12. The grounding cable reel of claim 11 wherein said conducting means includes a metal band formed in a generally circular shape about said inner hub and including a plurality of spaced contact points along the length thereof engaging the inner circular aperture in said outer swivel to provide contact with said outer swivel about the entire circumference of said inner hub.

13. The grounding cable reel of claim 12 wherein said contact points comprise a plurality of spaced louvers along the length of said metal band.

14. The grounding cable reel of claim 13 wherein said metal band is comprised of a silver alloy.

15. The grounding cable reel of claim 1 further comprising tamper-proof connecting means for securely coupling said inner hub and said outer swivel.

16. The grounding cable reel of claim 1 further comprising a water-tight seal between said first cable and a housing of the grounding cable reel.

17. A conductive slip ring assembly for use in a grounding cable reel for connecting equipment to neutral ground, said conductive slip ring assembly comprising:

a generally cylindrical conductive inner hub;

mounting means for attaching said inner hub to a hollow support shaft;

first coupling means for connecting an end of a first cable attached to the equipment to said inner hub;

a conductive outer swivel including an aperture therein for receiving said inner hub and allowing for rotational displacement between said inner hub and said outer swivel;

second coupling means for connecting an end of a second grounded cable to said outer swivel; and conductive bearing means disposed intermediate and in contact with said inner hub and said outer swivel about the entire respective outer and inner circumferences thereof.

18. The conductive slip assembly ring of claim 17 wherein said first coupling means includes a conductive rod coupled at one end to said first cable and at a second end to said inner hub.

19. The conductive slip ring assembly of claim 18 wherein said second coupling means includes a second set screw disposed in said outer swivel.

20. The conductive slip ring assembly of claim 17 wherein said inner hub and said outer swivel are comprised of metal.

21. The conductive slip ring assembly of claim 20 wherein said metal is brass.

22. The conductive slip ring assembly of claim 17 wherein said conductive bearing means is disposed about said inner hub so as to engage the aperture in said outer swivel about an entire inner circumference of said aperture.

23. The conductive slip ring assembly of claim 22 wherein said conductive bearing means includes a metal band formed in a generally circular shape about said inner hub and including a plurality of spaced contact points along the length thereof engaging the aperture in said outer swivel to provide contact with said outer swivel about the entire circumference of said inner hub.

24. The conductive slip ring assembly of claim 23 wherein said contact points comprise a plurality of spaced louvers along the length of said metal band.

25. The conductive slip ring assembly of claim 24 wherein said metal band is comprised of a silver alloy.

* * * * *